(12) United States Patent
Huntley et al.

(10) Patent No.: US 9,537,691 B2
(45) Date of Patent: Jan. 3, 2017

(54) DETERMINING A REPRESENTATION OF AN ELECTRICAL SIGNAL

(71) Applicant: IMAGE PROCESSING TECHNIQUES LIMITED, Basingstoke (GB)

(72) Inventors: Alex Huntley, Basingstoke (GB); Roger Fawcett, Basingstoke (GB)

(73) Assignee: Image Processing Techniques Limited, Basingstoke (GB)

( * ) Notice: Subject to any disclaimer, the term of this patent is extended or adjusted under 35 U.S.C. 154(b) by 0 days.

(21) Appl. No.: 14/852,445

(22) Filed: Sep. 11, 2015

(65) Prior Publication Data

US 2016/0112224 A1    Apr. 21, 2016

(30) Foreign Application Priority Data

Sep. 12, 2014   (GB) .................................. 1416147.5

(51) Int. Cl.
*H04B 17/00*   (2015.01)
*H04L 27/06*   (2006.01)
*H04L 25/03*   (2006.01)

(52) U.S. Cl.
CPC ......... *H04L 27/06* (2013.01); *H04L 25/03828* (2013.01)

(58) Field of Classification Search
CPC ....... G01R 13/0218; H04L 1/203; H04L 1/205
USPC ......................... 375/224, 228, 355, 373, 376
See application file for complete search history.

(56) References Cited

U.S. PATENT DOCUMENTS

| 7,107,499 B1 | 9/2006 | Acikel et al. |
| 8,744,012 B1* | 6/2014 | Ding ....................... H04L 1/203 |
| | | 375/316 |
| 9,143,316 B1* | 9/2015 | Novellini .............. H04L 7/0331 |

(Continued)

OTHER PUBLICATIONS

Patents Act 1977: Search Report under Section 17 for corresponding United Kingdom Patent Application No. GB1416147.5, 3 pgs., (Feb. 19, 2015).

*Primary Examiner* — David S Huang
(74) *Attorney, Agent, or Firm* — Blakely, Sokoloff, Taylor & Zafman LLP

(57) ABSTRACT

The invention relates to a method, systems, computer program, and computer-readable medium for reducing artefacts (speckling) which may appear to be noise/errors in a representation of an electrical signal. An Eye Pattern representation of a digital bit stream signal can be used for determining a range of signal quality characteristics, and can be generated from measurements of the proportion of ones and zeroes detected when sampling the signal at both at a reference data sampling position within a bit period and at a range of offset sampling positions. However, the speckling noise which typically exists in such an Eye Pattern reduces the confidence that can be placed in values for different signal characteristics which may be determined from the Eye Pattern. While speckling may be reduced by increasing the sampling frequency used to sample the signal, the present invention reduces speckling by using data gathered at the reference data sampling point to correct data gathered at each of the offset sampling positions. Thereby, the invention reduces the number of samples needed in order to reduce speckling to a particular level.

16 Claims, 8 Drawing Sheets

(56) References Cited

U.S. PATENT DOCUMENTS

2005/0259774 A1\* 11/2005 Garlepp .................... H04L 1/20
                                                              375/355
2010/0097087 A1   4/2010 Hogeboom et al.
2011/0311009 A1\* 12/2011 Flynn ...................... H04L 1/205
                                                              375/354

\* cited by examiner

DETERMINING A REPRESENTATION OF AN ELECTRICAL SIGNAL

FIELD

The present invention relates to a method of determining a representation of an electrical signal, and corresponding systems, a computer program, and a computer-readable medium.

BACKGROUND

In the field of serial data communications, the quality of a serial digital bitstream signal as shown in FIG. 1a is often assessed by observing a visual representation of the amplitude of the signal with respect to time and measuring parameters such as amplitude, pulse width, rise time, fall time, undershoot, overshoot, jitter and distortion. The serial digital bitstream signal has a bit period 120 corresponding to a time period for a single data bit, and an amplitude which can vary between a value (e.g. 0 Volts) corresponding to a logic zero and a value (e.g. 1 Volt) corresponding to a logic 1 (although other signal encodings are possible). The range of amplitudes and the time period corresponding to the bit period 120 define a bit cell 110.

The above parameters of the signal can be assessed from the shape produced by superimposing individual signal traces, each individual signal trace being a single bit period in length, for a plurality of bits of the bitstream signal (as illustrated in FIG. 1b). The shape of the resulting trace broadly resembles the general shape of the human eye: for this reason, traces of this type are often referred to as 'Eye patterns'. Note: There are other patterns referred to as Eye patterns from their similarity in shape to an eye, in particular patterns deduced from determinations of bit error rates, but the ones discussed in this document are those of the form illustrated in FIG. 1b and mentioned above.

A variety of approaches may be taken to generating Eye Patterns of the form shown in FIG. 1b. Methods disclosed herein use either a very high-speed Analog-to-Digital Converter (ADC) or sample-and-hold Integrated Circuits (sample and hold ICs). An existing circuit for generating Eye Patterns is shown in brief in FIG. 2.

Referring to FIG. 2, a plurality of measurements (or "samples") 5 of the incoming signal 1 can be taken by the circuit by a sampling module 9. In the circuit of FIG. 2, sampling module 9 always takes each sample 5 of the incoming signal 1 at a nominal sampling position, e.g. at the centre of the bit period 120 (the bit period 120 being determined using the Recovered Clock 2, which clock is recovered using existing means, not shown, from the incoming signal 1). Each of these samples can be referred to as a 'Data Sample'. Each Data Sample taken by the sampling module 9 can subsequently be processed (not shown) to determine whether the voltage level of the sample is above a selected voltage base level (or "threshold") in which case the sample is determined to be a "logic one", or below that threshold in which case the sample is determined to be a "logic zero".

Some existing circuits also provide the facility, e.g. with sampling module 10 shown in FIG. 2, to record another plurality of measurements (or "samples") 6 of the incoming signal 1, and to take these other samples using both a 'vertical' (amplitude, e.g. voltage) offset 3 and a 'horizontal' (time) offset 4 compared with the nominal (or "reference") data sampling position (e.g. the centre of the bit cell 110). These other samples can be referred to as "Offset Samples".

FIG. 3 illustrates the centre 11 of a bit cell 110 (which is the position where the Data Samples are taken), and the offset sampling position 12 (where the Offset Samples are taken). The offset sampling position is horizontally offset, i.e. in time, from the nominal sampling position by the horizontal time offset 4, and as shown in FIG. 2 this can be achieved by a module 8 which inserts a time delay into the clock which is used to drive the sampling module 10 which samples the input signal 1 to produce the offset samples 6. Alternatively the input signal 1 can be delayed before being input into the sampling module 10. The offset sampling position is also vertically offset, in amplitude, e.g. in voltage, from the nominal sampling position by the vertical offset 3. As shown in FIG. 2, this can be achieved in practice by for example adding a voltage offset to the input signal 1 before the signal is input to the sampling module 10. Alternatively, instead of adding an offset to the input signal before it is input to sampling module 10, subsequent circuitry which processes the samples 6 can be arranged to apply an offset when processing the samples to determine if each sample is a logic one or a logic zero, e.g. by adding an offset to a voltage reference against which each sample is compared to make the determination.

An Eye Pattern representation of the input signal can be built up by processing multiple samples of the offset sample 6 data obtained using different combinations of horizontal offset and vertical offset which are generated to give full coverage of a range of time delays and a range of voltages, so as to span at least a portion of a bit cell 110. An existing procedure for determining an Eye Pattern Representation of the input signal 1, based on a plurality of offset samples 6, is as follows:

For a plurality of offset data samples taken using a particular vertical offset and a particular horizontal (time) offset, a number (or proportion) of offset samples 6 that are determined to be "logic ones" is recorded. This is repeated using a plurality of different vertical offsets which span the range of voltages of a bit cell 110. The result is a single vertical profile 14, such as that shown in FIG. 4, for the particular horizontal offset, each value along the profile 14 corresponding to a respective number (or proportion) of logic ones for a respective one of the plurality of vertical (voltage) offsets.

The procedure in the above paragraph can then be repeated for a plurality of different horizontal (time) offsets, so as to produce a corresponding plurality of vertical profiles 13,14. The order in which vertical and/or horizontal offsets are sequenced when taking the offset samples of the input signal 1 is not important and can be changed from the above example, e.g. interleaved.

For each of these profiles 13,14, the number/proportion of determined logic ones should be 0 for the highest vertical offset (since for the method to give correct results, the highest vertical offset must be above the highest possible amplitude of the input signal 1), and the number/proportion should be 100% for the lowest vertical offset (which for correct operation needs to be lower than the lowest possible input signal amplitude). Between these two extremes, the measured number/proportion of logic ones provides an indication of the difference between the number of times the signal amplitude is above a particular vertical offset and the number of times that the signal amplitude was below that particular vertical offset.

In accordance with the principles of calculus, the values in each profile 13,14 are then differentiated with respect to their corresponding vertical offsets, to determine an intensity profile which reveals the distribution of input signal amplitudes sampled at that particular horizontal offset (i.e. the relative likelihood of the input signal 1 having a particular amplitude when sampled at the particular horizontal offset within a bit cell 110, or, put another way, the 'signal intensity' at that particular vertical and horizontal offset). Data values resulting from this differentiation operation are illustrated in profiles 15 and 16 in FIG. 5 and can be referred to as 'vertically differentiated slices'.

A plurality of the vertically differentiated slices 15,16 can then be combined side-by-side, to thereby derive an Eye Pattern representation of the input signal 1. For ease of presentation, the different differential data values (corresponding to 'signal intensity' at each particular horizontal and vertical offset within a bit period) are typically represented either by a spectrum of colours or by shades of grey, with black used in both cases where the differential is 0 (representing no change in the proportion of ones).

A problem with existing methods of deriving an Eye Pattern representation of an input signal, such as the method described above, is that although the centre of the "eye", as shown in FIG. 1, should ideally be completely black (i.e. data values of zero), in practice such a circuit as described above tends to generate Eye Patterns which comprise undesirable artefacts (e.g. which appear to be noise and/or errors) in the differential data. Such artefacts are especially noticeable in the centre of the eye, where they typically manifest themselves as "speckling" (e.g. apparently random bright spots) which generally reduces the accuracy with which signal parameters such as rise time, fall time etc. can be determined from the Eye Pattern representation of the signal.

SUMMARY

An object of the present invention is to at least address the above-identified problems. Various aspects of the invention are defined in the appended claims.

For a truly random input signal measured over an infinite number of data bits, the random-like nature of the incoming data should result in substantially the same number of bit periods having a sampled value above a voltage threshold which is in the centre of the bit cell 110 as the number of bit periods having a sampled value below that central voltage threshold. In other words, the proportion of logic ones compared with logic zeroes at the central sampling position 11 (and indeed at any point along the horizontal line through sampling position 11) should be 0.5 (otherwise represented as 50%). Furthermore, for offset samples 6 which are sampled using a vertical voltage offset 3 and a horizontal time offset 4, the proportion of logic ones to logic zeroes should also be 0.5 at any offset sampling point 12 within the central 'open eye' of the Eye Diagram shown in FIG. 1b—because there should be nothing in this region to change the numbers of logic ones and logic zeroes experienced at the different Offset Sample positions 12 within this region. The proportions of logic ones within the central eye therefore being constant at 0.5, the differential is zero, and hence this part of the Eye pattern should be completely black.

However, in the real world, the finite number of samples in each plurality of samples taken at each vertical and horizontal offset means that there will inevitably be small imbalances in the numbers of ones and zeros in any set of samples of the input signal taken for a particular horizontal and vertical offset. While in theory, for a random input signal measured over an infinite number of samples, the proportion of logic ones measured within the open eye region should be 0.5, in practice the proportion at one particular vertical offset could be 0.51 while the proportion immediately beneath it at another particular vertical offset could be 0.49—purely as a result of variations in the input data sampled at the different offsets. As illustrated in FIG. 6, it has been realised that these differences in values of the proportion of logic ones (profile 13) introduce spikes in the differential (profile 15), and that this is a source of "speckles" (a.k.a. noise/errors/artefacts) in the Eye Pattern representation of the input signal. These speckles are particularly troublesome near the central eye of the Eye Pattern since the presence of these speckles significantly reduces the precision of any measurements of amplitude, pulse width, rise time, fall time, undershoot, overshoot, jitter and distortion which can be made from the Eye Pattern.

Binomial distribution analysis shows that any imbalance in the occurrence of logic ones and logic zeroes in the sampled input data becomes less significant when a greater number of samples are taken, and hence one way to reduce this noise is simply to increase the number of samples taken. However, simply adding extra samples results in a significant and unwelcome additional overhead, particularly in terms of time taken to derive an Eye Pattern representation of an input signal, and in terms of memory required, which overheads are especially relevant in a time and memory limited application such as real-time video analysis.

The present invention offers a significant benefit in this regard, by providing a way of significantly reducing the noise in the Eye Pattern without the additional overhead of gathering more samples. Put another way, the invention reduces the number of samples that are required in order to achieve an Eye Pattern representation having a particular desired noise level.

In general, aspects and embodiments of the invention deliver these benefits by reducing errors in a proportion of logic ones determined for a set of offset samples 6 of the input data 1 taken at a particular offset sampling position 12, by applying a correction, the correction being based on any deviation from 0.5 of a proportion of logic ones determined substantially simultaneously for a corresponding set of data samples 5 of the input data 1 taken at the data sampling position 11 (e.g. at the centre of the bit cell 110).

In a first aspect there is provided a method of generating a representation of an electrical signal, the method comprising:

for each of a plurality of predetermined threshold values:
determining, for a respective first plurality of samples of the signal, a first indication of a number of said first plurality of samples having a predetermined property that meets a comparison criterion with respect to a reference threshold value;
determining, for a respective second plurality of samples of the signal, a second indication of a number of said second plurality of samples having said predetermined property that meets the comparison criterion with respect to said predetermined threshold value, wherein the respective second plurality of samples correspond in time to the respective first plurality of samples; and
correcting the second indication using the first indication to thereby derive a respective corrected indication of a number of said second plurality of samples having said predetermined property that meets said comparison criterion with respect to said predetermined threshold value;

generating the representation of the signal using the respective corrected indications.

In a second aspect there is provided a system arranged to carry out the method of the first aspect.

In a third aspect there is provided a computer program comprising instructions which when executed by one or more processors cause the method of the first aspect to be carried out.

In a fourth aspect there is provided a computer-readable medium storing instructions which when executed by one or more processors cause the method of the first aspect to be carried out.

In a fifth aspect there is provided a system for generating Eye Patterns that, for each of a plurality of offset sampling positions spanning at least part of the range of voltages comprised in a serial data bit stream signal and spanning at least part of a bit period of the signal, substantially simultaneously measures a proportion of samples of the signal which meet or exceed the voltage of the respective offset sampling position and measures a proportion of the samples which meet or exceed a voltage of a reference sampling position which is substantially in the centre of the bit period, wherein the system uses the respective proportion measured at the reference sampling position to correct the respective proportion measured at each offset sampling position, which respective corrected proportion is then combined with similarly corrected proportions for others of the plurality of offset sampling positions to derive an Eye Pattern representation of the signal.

Further optional features and embodiments of the above aspects will now be described.

Optionally, the signal is a serial digital bit stream signal having a bit period.

Optionally, the predetermined property of a sample is based on one or more of a voltage for said sample and a current for said sample.

Optionally, the reference threshold value is approximately equal to a mean amplitude for the signal.

Optionally, the reference threshold value is approximately equal to a midpoint of a sampling range available for sampling the signal.

Optionally, said comparison criterion with respect to a particular threshold value is selected from the group of comparison criteria comprising: a comparison criterion which is deemed to be met when said predetermined property of a sample is greater than or equal to said particular threshold value; a comparison criterion which is deemed to be met when said predetermined property of a sample is greater than said particular threshold value; a comparison criterion which is deemed to be met when said predetermined property of a sample is less than or equal to said particular threshold value; and a comparison criterion which is deemed to be met when said predetermined property of a sample is less than said particular threshold value.

Optionally, each sample of the respective first plurality of samples relates to the same bit period as a corresponding sample of the respective second plurality of samples.

Optionally, each sample of the respective first plurality of samples is sampled at a time offset that is substantially at a midpoint of a bit period.

Optionally, the time offset and/or bit period is derived using a clock recovery technique.

Optionally, the correction applied to the second indication is based on the difference between the first indication and a value corresponding to 50% of a total number of said respective first plurality of samples.

Optionally, the correction applied to the second indication uses a power-law function.

Optionally, the correction applied to the second indication is calculated as a logarithm of 0.5 divided by a logarithm, to the same base, of the first indication.

Optionally, the method further comprises differentiating the respective corrected indications against the respective predetermined threshold values, thereby deriving a series of intensity values which constitute the representation of the signal, wherein the representation of the signal is thereby a vertical slice through an Eye Pattern representation of the signal. Optionally, the method is repeated for a plurality of time delays with respect to a bit period, wherein each of the second plurality of samples is sampled at a time offset within the bit period which is determined according to the respective time delay, and wherein each of the first plurality of samples is sampled at a reference time offset within the bit period that is substantially constant for each respective time delay, and wherein the respective representations of the signal for each of the plurality of time delays are combined side by side so as to generate an Eye Pattern representation of the signal. Optionally, the reference time offset is substantially at the midpoint of the bit period.

It will be appreciated that certain features of certain aspects, along with other optional features in embodiments described herein, can be advantageously combined with certain other aspects, as would be understood by a skilled person. The above aspects are not intended to limit the invention which is instead defined by the appended claims.

The detailed description of embodiments below should not be interpreted as meaning that all described method steps and/or system elements are essential. Instead, certain method steps and/or system elements may be understood by a skilled person to be optional, even where those steps/elements are not explicitly described as being optional. The appended claims define the essential features of the invention.

DESCRIPTION OF FIGURES

In order that the invention may be more readily understood, preferred embodiments will now be described, by way of example only, with reference to the accompanying Figures, in which.

DETAILED DESCRIPTION

Figure 7:
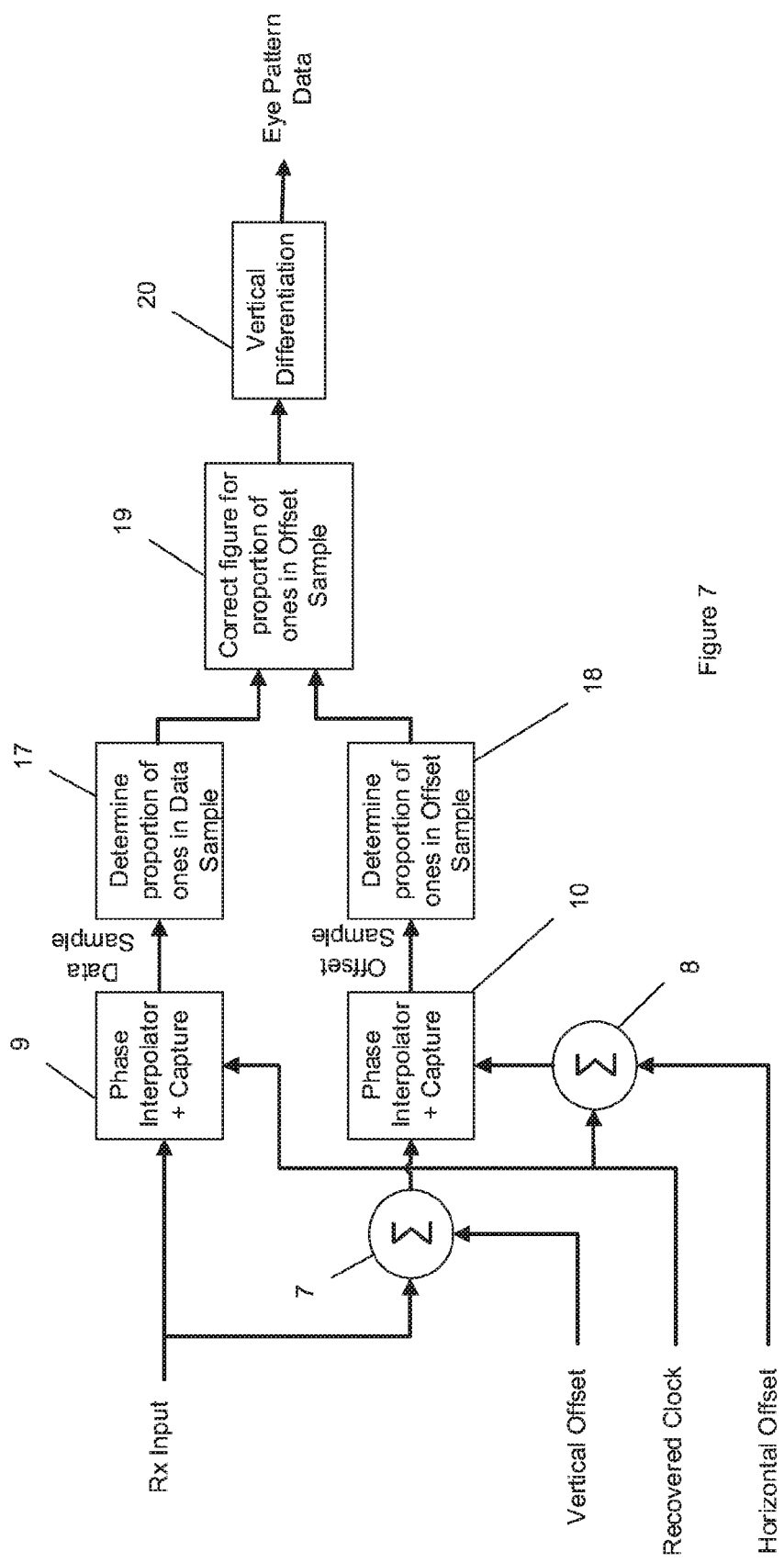
FIG. 7 is a schematic representation of a system or electronic circuit which is arranged to reduce the noise shown in FIG. 6 by compensating for errors in the measured proportion of '1's and '0's.

A system (e.g. an electronic circuit) which is an embodiment of the invention is shown in schematic form in FIG. 7. A first data sampling module 9 of the circuit uses a clock signal (which has, for example, been recovered from the input data 1 by any existing clock recovery circuitry, and is termed the "recovered clock") to sample the input data 1 at a data sampling position 11 which is substantially in the centre of each bit cell 110 to produce a first plurality of samples, each of which is also termed herein a Data Sample 5. A logic zero or a logic one is determined from each data sample 5 according to whether a predetermined parameter of the respective data sample 5 meets a predetermined criterion. The predetermined parameter may for example be a voltage amplitude of the sample, or some other parameter e.g. a current flowing when the sample was taken. An example predetermined criterion is whether the predetermined parameter is above a predetermined threshold, such as for example the predetermined parameter of the sample being above a threshold (although other criteria can be used, e.g. greater than or equal to, less than or equal to, or less than). For the data samples, the threshold can be termed a 'reference' threshold, which is for example a mean amplitude level of the input signal (e.g. a mean voltage level of the input signal).

Offset sampling module 10 of the circuit samples substantially the same input signal (e.g. the same input signal over the same time period) at an offset sampling position 12 within each bit cell 110, which sampling position is offset in time by a horizontal offset 4, and (at least conceptually) offset along the signal amplitude axis by a vertical offset 3, to produce a second plurality of data samples, each of which is termed herein an Offset Sample 6. The horizontal offset can be achieved in practice by inserting a time delay (selectable according to horizontal offset 4, and applied through module 8) into a clock signal which drives the offset sampling module 10. Alternatively the horizontal offset can be achieved by inserting a selectable delay into the input signal 1 before it is sampled by offset sampling module 10.

A logic zero or a logic one is determined from each offset sample according to whether the predetermined parameter of each offset sample 6 meets the predetermined criterion. Similarly as for the data samples, an example predetermined criterion is whether the predetermined parameter of the respective offset sample is above a threshold. For the offset samples, however, the threshold involved in the predetermined criterion is a predetermined threshold (e.g. a voltage threshold) which is selectable so as to enable the vertical offset to be varied. The predetermined threshold voltage can be included in the determination by adding/subtracting it at module 7 to/from, respectively, the input signal 1 before the signal is sampled at offset sampling module 10, or alternatively the predetermined threshold voltage can be included in the determination in another way, such as for example by adding/subtracting the predetermined threshold voltage from a voltage reference feeding a comparator which makes the determination of the sample being a logic one or a logic zero. The vertical offset and horizontal offset are held substantially constant while sampling the second plurality of data samples.

Modules 17 and 18 simultaneously count the numbers of logic ones and/or logic zeroes in the first plurality of samples and in the second plurality of samples respectively, over substantially the same input signal period (corresponding to substantially the same number of samples of the input signal 1 in each of the first and second pluralities of samples) to determine the proportion of logic ones in the first plurality of samples (Data Samples) and the proportion of logic ones in the second plurality of samples (Offset Samples) respectively. It will be appreciated that if the total number of samples in the first and/or second plurality of samples is known then it is only necessary to count either the number of logic ones or the number of logic zeroes in order to determine the proportion of logic ones.

Module 19 applies a correction to the proportion of logic ones determined for the second plurality of samples (Offset Samples), based on the proportion of logic ones determined for the first plurality of samples (Data Samples). The correction that is applied to the proportion for the Offset Sample can take many forms. A non-limiting example that has been found to give optimal results is the following power-law function:

$$\text{OffsetSample\_Proportion}_{Corrected} = (\text{OffsetSample\_Proportion}_{Measured})^\gamma$$

where $$\gamma = \log(0.5)/\log(\text{DataSample\_Proportion}_{Measured})$$

using logarithms of any base.

An advantageous property of the above function is that when the proportion of logic ones determined for the Data Samples is less than 0.5, the corrected proportion of logic ones for the Offset Samples is increased, with larger variations from 0.5 resulting in larger adjustments to the proportion for the Offset Samples, and when the proportion of logic ones measured for the Data Samples is above 0.5, the corrected value for the Offset Samples is similarly decreased. It will also be noted that Offset Sample proportion values of 0 and 1 are unchanged by the above transformation.

Results are optionally obtained, by repeating the above steps, for each of a plurality of vertical (e.g. voltage) offsets spanning the full range of possible input signal amplitudes, e.g. from below the lowest input signal amplitude to above the highest input signal amplitude, and for horizontal (time) offsets (e.g. relative to the centre of the bit period 120, or relative to the beginning of the bit period 120) spanning a complete bit period 120.

Figure 5:
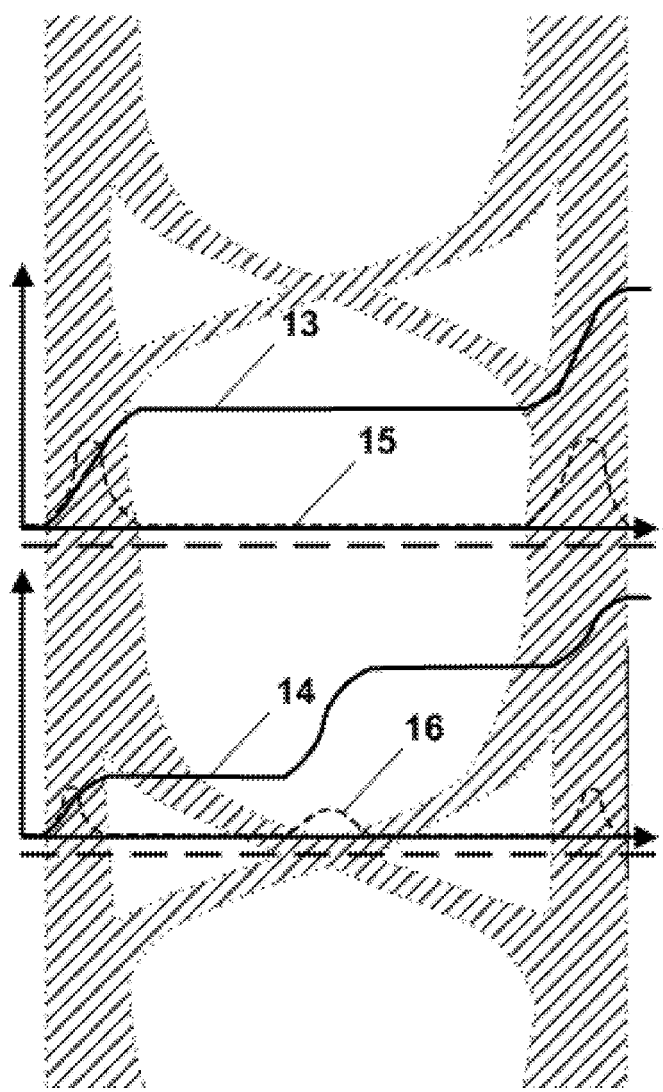
FIG. 5 is a 90 degrees counterclockwise rotated view of FIG. 4, additionally including, for each plot of the proportion of '1's and '0's, a plot of the differential of the respective plot vs signal amplitude offset.
Figure 6:
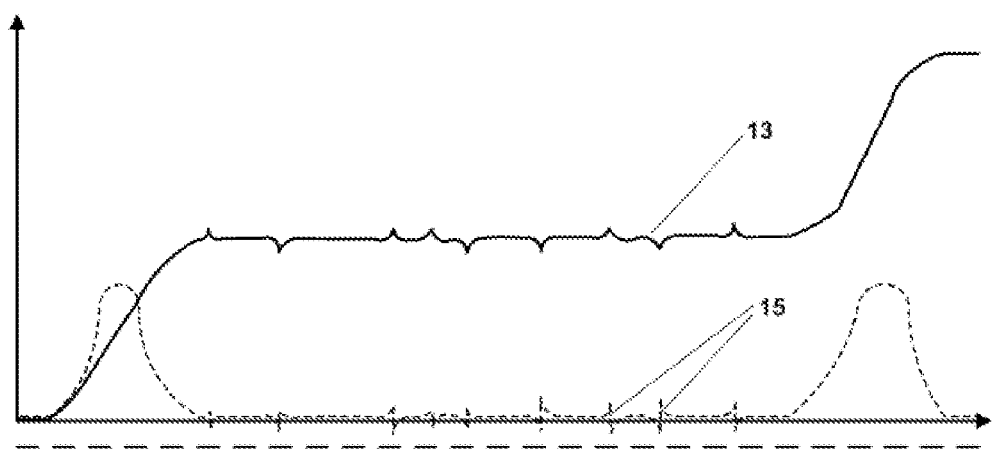
FIG. 6 is a more detailed view of the upper plots of the proportion of '1's and '0's, and the associated differential, as shown in FIG. 5, showing "noise" in those plots which the present invention seeks to reduce.

The above steps can be performed for one or more of a plurality of different horizontal offsets spanning at least a portion of the bit period 120. For each particular horizontal offset used to sample the offset samples, the corrected offset sample proportion values obtained for each of the range of vertical offsets form a vertical 'profile' similar to that shown as profiles 13,14 in FIGS. 5 and 6, except that the noise spikes shown in FIG. 6 are reduced. The profile is then 'differentiated' (at module 20 in FIG. 7) to derive an intensity profile showing the distribution of input signal amplitude probabilities experienced at that particular horizontal (time) offset. The above process can be repeated for a plurality of horizontal offsets spanning the whole or a portion of a bit period 120, and the resulting plurality of profiles can be compiled side-by-side so as to derive an Eye Pattern.

The effect of applying the correction as disclosed above is to reduce variations (i.e. noise) which otherwise would be manifested in the resulting Eye Pattern representation of the input signal. These variations in the vertical profiles of proportions of logic ones are corrected (and hence smoothed), and as a result the level of noise in the differential profiles which are comprised in the Eye Pattern are reduced. The level of noise visible in the Eye Pattern is significantly reduced as a result, which significantly increases the level of precision that can be ascribed to measurements of signal amplitude etc. which may be made from the Eye Pattern. This in turn significantly improves the confidence that can be placed in signal characteristics determined from those measurements.

Figure 8:
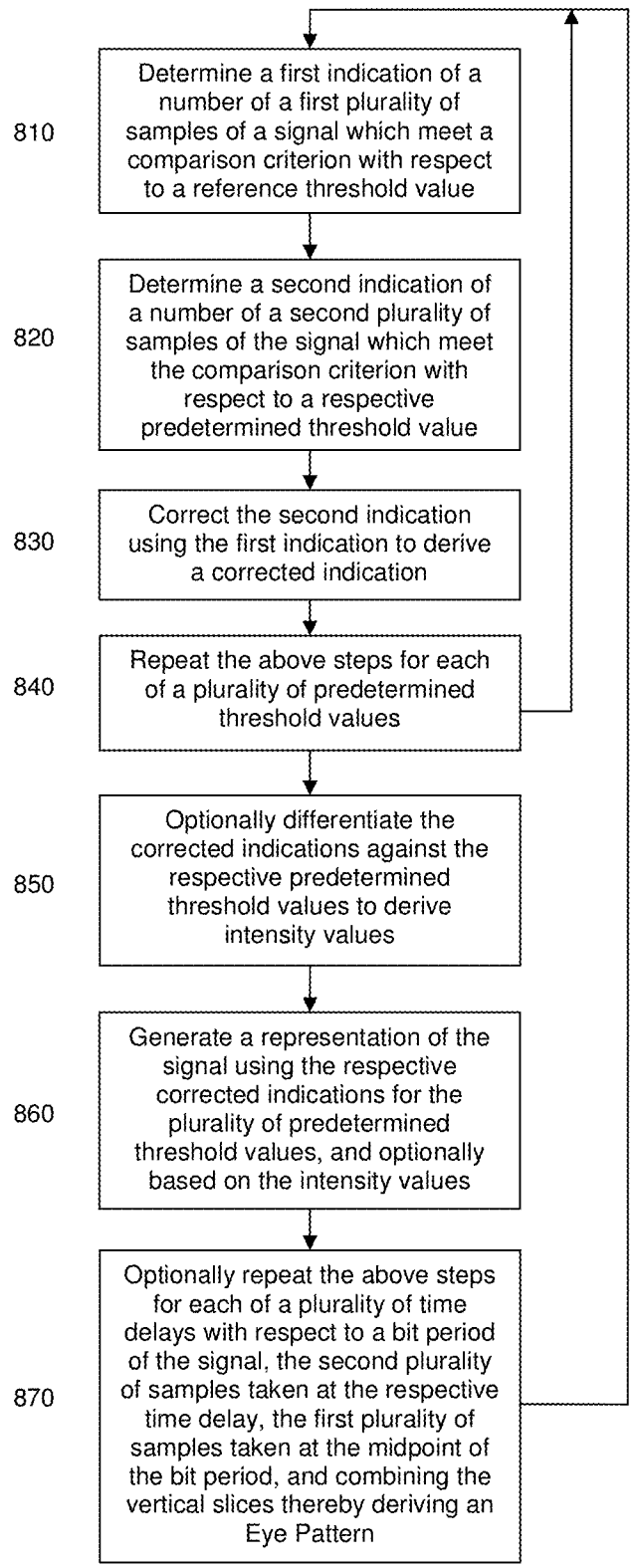
FIG. 8 is a method flow diagram illustrating method steps according to an embodiment of the invention.

As shown in FIG. 8, a method in accordance with the above description will now be described, which in embodiments may, for example, be carried out using software instructions as part of a computer program running on a computing device such as that described with reference to FIG. 9, and/or by one or more dedicated hardware modules, and/or by one or more finite state machines. As will be understood, any combination of such elements can be used to implement the method.

Figure 1A:
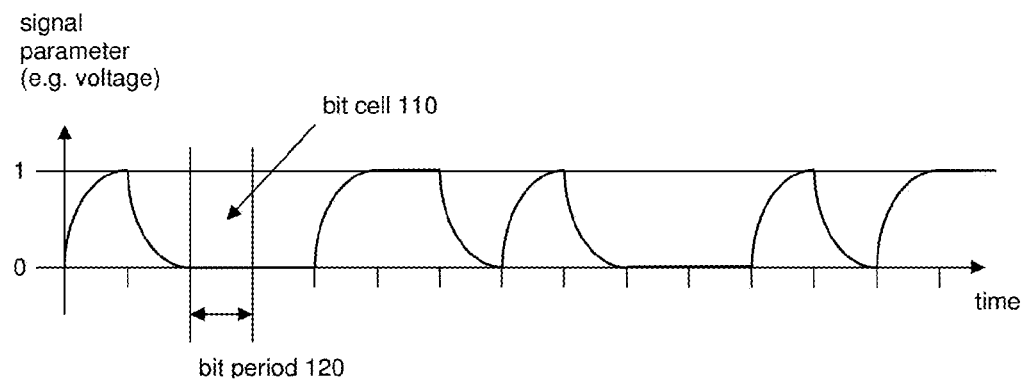
FIG. 1a shows a digital bit stream signal.

FIG. 8 illustrates a method of generating a representation of an electrical signal (also termed an "input signal"), for example a digital bit stream signal such as that shown in FIG. 1a which signal has a bit period 120. The signal comprises a number of signal transitions where the signal transitions from a first signal value to a second signal value. Each signal value can be represented by a property of the signal, such as by a voltage associated with the signal, by a current associated with the signal, or by a combination of these. The signal is sampled over a plurality of bit periods, for example using an Analogue to Digital Converter (ADC), to produce a first plurality of samples of the signal, wherein each sample corresponds with a particular bit period of the signal, and a second plurality of samples of the signal, wherein each sample of the first plurality of samples relates to the same bit period as a corresponding sample of the second plurality of samples, such that the first plurality of samples and the second plurality of samples correspond with each other in time (another way of saying this is to say that the first and second pluralities of samples are "strictly correlated" in time).

Figure 1B:
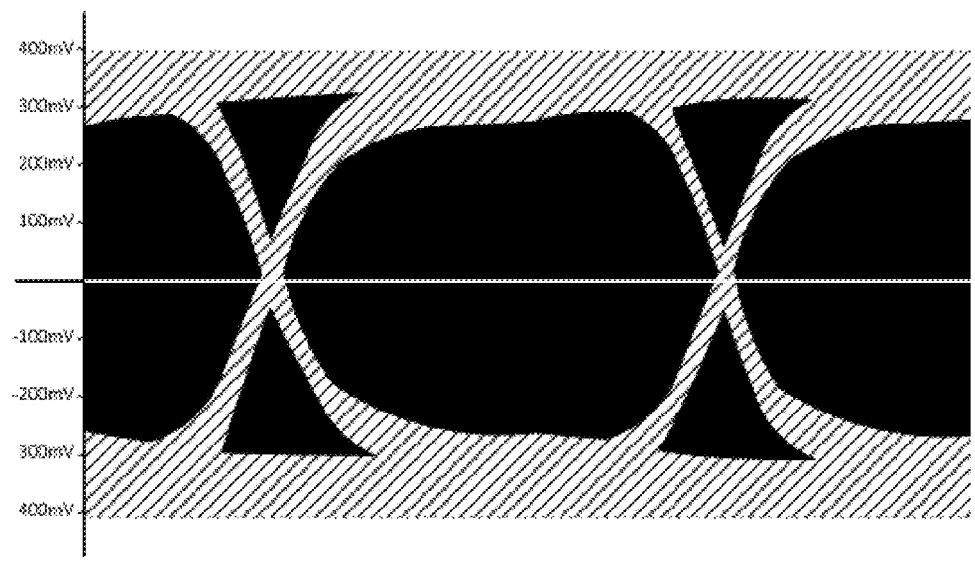
FIG. 1b shows an "Eye Pattern" representation of a plurality of signal measurements, to which embodiments of the present invention relate.
Figure 2:
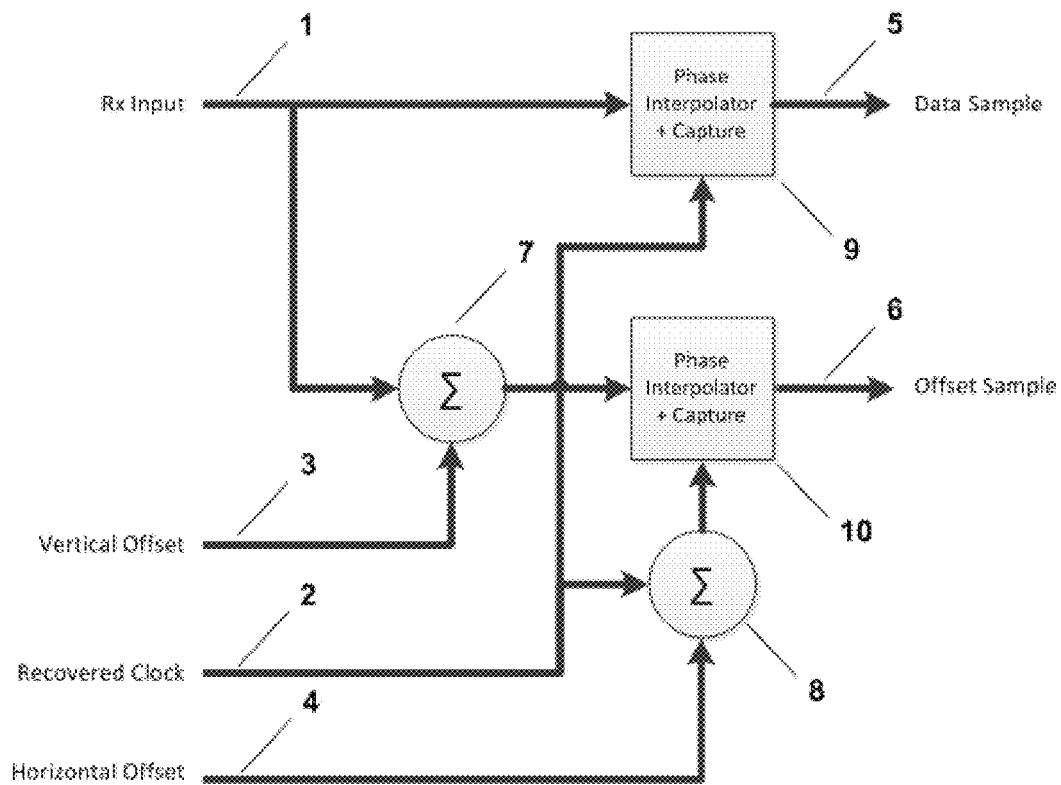
FIG. 2 is a schematic representation of an existing system which is implemented as part of some existing integrated circuits, and which can be used for measuring an electrical signal, which measurements can be represented as an "Eye Pattern" representation such as that shown in FIG. 1.
Figure 3:
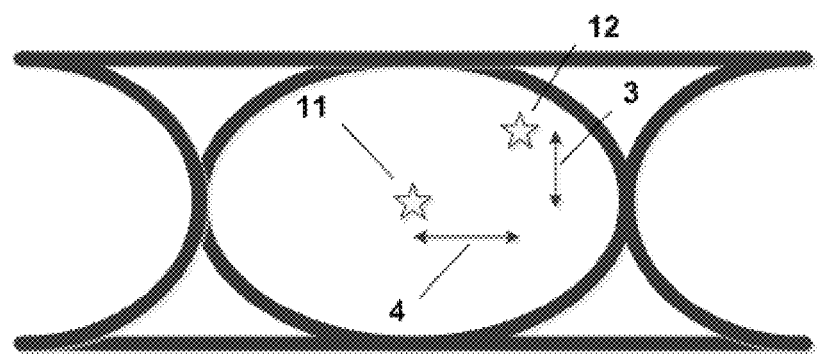
FIG. 3 is a diagram of an Eye Pattern, showing time and amplitude offsets which define an offset sampling point at which an input signal may be sampled.

A clock recovery circuit, such as any existing clock recovery circuit, can be used to recover a clock signal from the input signal, the clock signal having a fixed relationship with the input signal (e.g. the recovered clock having a clock period that is equal to the minimum period between transitions of the input signal, which minimum period is termed herein the bit period, and e.g. the recovered clock edges having a fixed relationship with the points at which the transitions of the input signal may occur) by virtue of the clock signal being derived from the input signal. In the described embodiments, two ADCs are employed, each of which samples the electrical signal at points in time which are determined with reference to the recovered clock, and thus a first plurality of samples and a corresponding second plurality of samples are produced from the electrical signal. It will be appreciated however that with suitable multiplexing, fewer or a greater number of ADCs could be used while still producing first and second pluralities of samples which correspond with each other in time (which are "strictly correlated"—i.e. each sample of the first plurality of samples relates to the same bit period as a corresponding sample of the second plurality of samples). Preferably each of the first plurality of samples is taken at a time within its respective bit period which is substantially in the middle of the bit period 120, or in the centre 11 of the open "eye" of the Eye Pattern representation of the signal shown in FIGS. 1b and 3, since this is the position through which it is least likely that a signal trace will pass. However, provided that the position at which the first plurality of samples is taken is chosen to be at a point within the bit cell 110 through which substantially no signal traces pass, then the results of the method described herein will not be substantially degraded. The time offset within each bit period at which each of the second plurality of samples is taken is predetermined and is selectable so as to allow the time offset to be varied so as to traverse the bit period. The following method operates on the first and second pluralities of samples.

At step 810, an indication (termed a first indication) of a number of the first plurality of samples having a predetermined property that meets a comparison criterion with respect to a particular threshold value is determined. For example, the predetermined property is a voltage associated with the sample, and the comparison criterion is whether or not the sample voltage is greater than the particular threshold value. Samples which meet the criteria can for example be considered to represent a logic one, and samples which do not meet the criteria can conversely be considered to represent a logic zero. For the first plurality of samples, the particular threshold value which is used is a reference threshold value which is a substantially constant value for all samples in the first plurality of samples. For example, the reference threshold value is equal to a mean amplitude of the input signal.

At step 820, an indication (termed a second indication) of a number of the second plurality of samples having the predetermined property that meets the comparison criterion with respect to another particular threshold value is determined. For the second plurality of samples, the particular threshold value which is used is a predetermined threshold which is selectable. For each of one or more successive iterations of step 820, the predetermined threshold may be selected so as to span a range of threshold values, for example a range spanning from the minimum input signal amplitude to the maximum input signal amplitude.

Each of the indications may directly be a number of samples which meet the comparison criterion, or alternatively each of the indications may be a proportion of a number of samples which meet the comparison criterion compared with a number of samples which do not meet the comparison criterion.

At step 830, the second indication is corrected using the first indication, to thereby derive a corrected indication of the number of the second plurality of samples having said predetermined property that meets the comparison criterion with respect to the predetermined threshold value. For example, the correction applied to the second indication to arrive at the corrected indication can be based on a difference between the first indication and a value corresponding to 50% of a total number of the first plurality of samples (e.g. if the first indication is 51% then the correction is based on the difference between 51% and 50%, i.e. 51−50=1%).

Step 840 repeats steps 810 to 830 for each of a plurality of (different) predetermined threshold values as used in step 830, thereby determining corrected indications for each of the plurality of predetermined threshold values.

Figure 4:
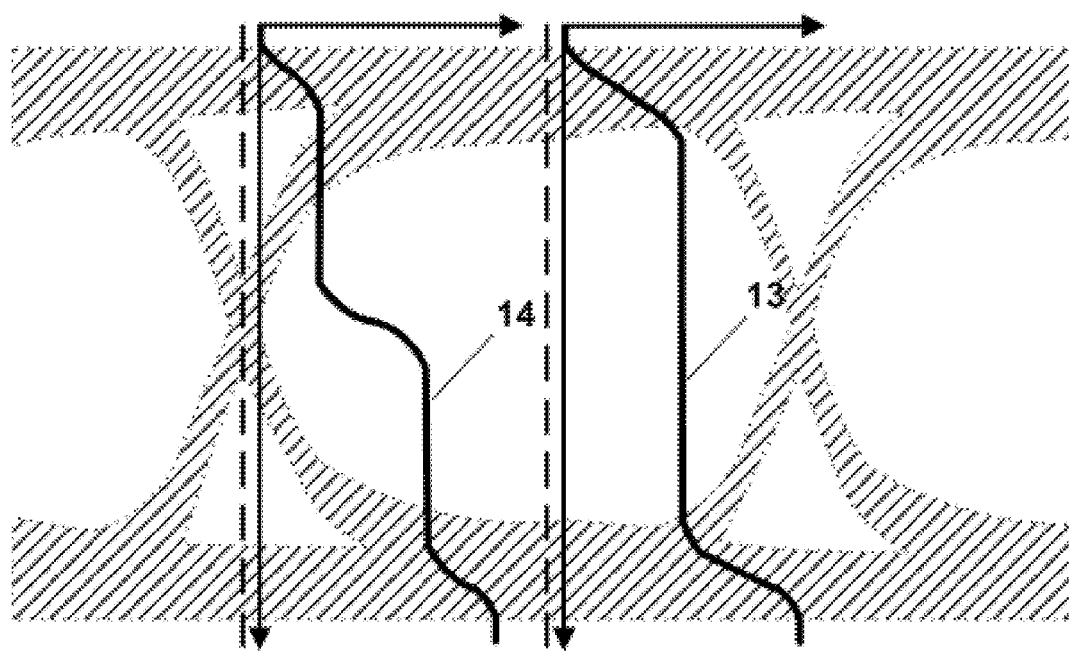
FIG. 4 shows two profile graphs of the proportion of sampled logic '1's compared with sampled logic '0's, each at a different time offset, plotted versus signal amplitude offset, and superimposed on an Eye Diagram representation of the signal being measured.

Step 860 generates a representation of the electrical signal using the plurality of corrected indications, each corrected indication corresponding to one of the plurality of predetermined threshold values and corresponding to a single predetermined time offset (referred to as a time delay) with respect to each bit period 120. The generated representation is thereby a vertical strip based on the corrected indications for that predetermined time delay, and can for example correspond to traces 13 and 14 in FIGS. 4 to 5.

Optionally, however, at step 850 the corrected indications are first differentiated against their respective corresponding predetermined threshold values, so as to derive a corresponding plurality of intensity values. These intensity values represent the relative likelihood of the input signal 1 having a particular amplitude when sampled at the predetermined time offset. When optional step 850 is carried out, the representation referred to at step 860 is based on the differentiated corrected indications (the intensity values) and as such the generated representation is thereby a vertical strip of an Eye Pattern representation of the input signal, the vertical strip corresponding to the predetermined time offset, and corresponding to traces 15 and 16 in FIG. 5.

Optionally at step 870, steps 810 to 860 are repeated (as applicable) for one or more time delays with respect to a bit period 120. In each iteration, the time within the bit period at which each of the first plurality of samples is taken remains substantially at a reference time offset within the bit period (e.g. at the midpoint or centre of the bit period) which can be substantially constant for each iteration, while the time within the bit period at which each of the second plurality of samples is taken is determined according to the respective time delay, such that a portion of a bit period can be spanned by successive iterations. The result of such iterations is a plurality of vertical strips of the kind produced at step 860. When such strips are vertical strips of an Eye Pattern representation of the input signal (by virtue of optional step 850) then by combining the vertical strips side-by-side an Eye Pattern representation of the input signal can be derived.

Although in the embodiments described above, examples have been given of the reference time offset being substantially at the midpoint or centre of the bit period, and the reference threshold being substantially at a mean voltage of the input signal, in other embodiments any time offset and reference threshold can be used which, in combination with each other, place the point within each bit cell 110 at which each of the first plurality of samples are taken (otherwise referred to as the "reference sampling position") substantially within the open "eye" of the Eye Pattern. This is because, within the open eye region of the Eye Pattern, there are substantially no signal traces passing through that region to alter the ratio of logic ones and logic zeroes determined at such a reference sampling position. Accordingly, although the central position within the open eye region is optimal for the reference sampling position (since that is the point furthest away from any signal traces, and thus is the point least likely to encounter a signal trace passing through it), other sampling positions within the open eye, or even within an adjacent open eye region, can be used without substantially degrading the results of the method described herein.

Figure 9:
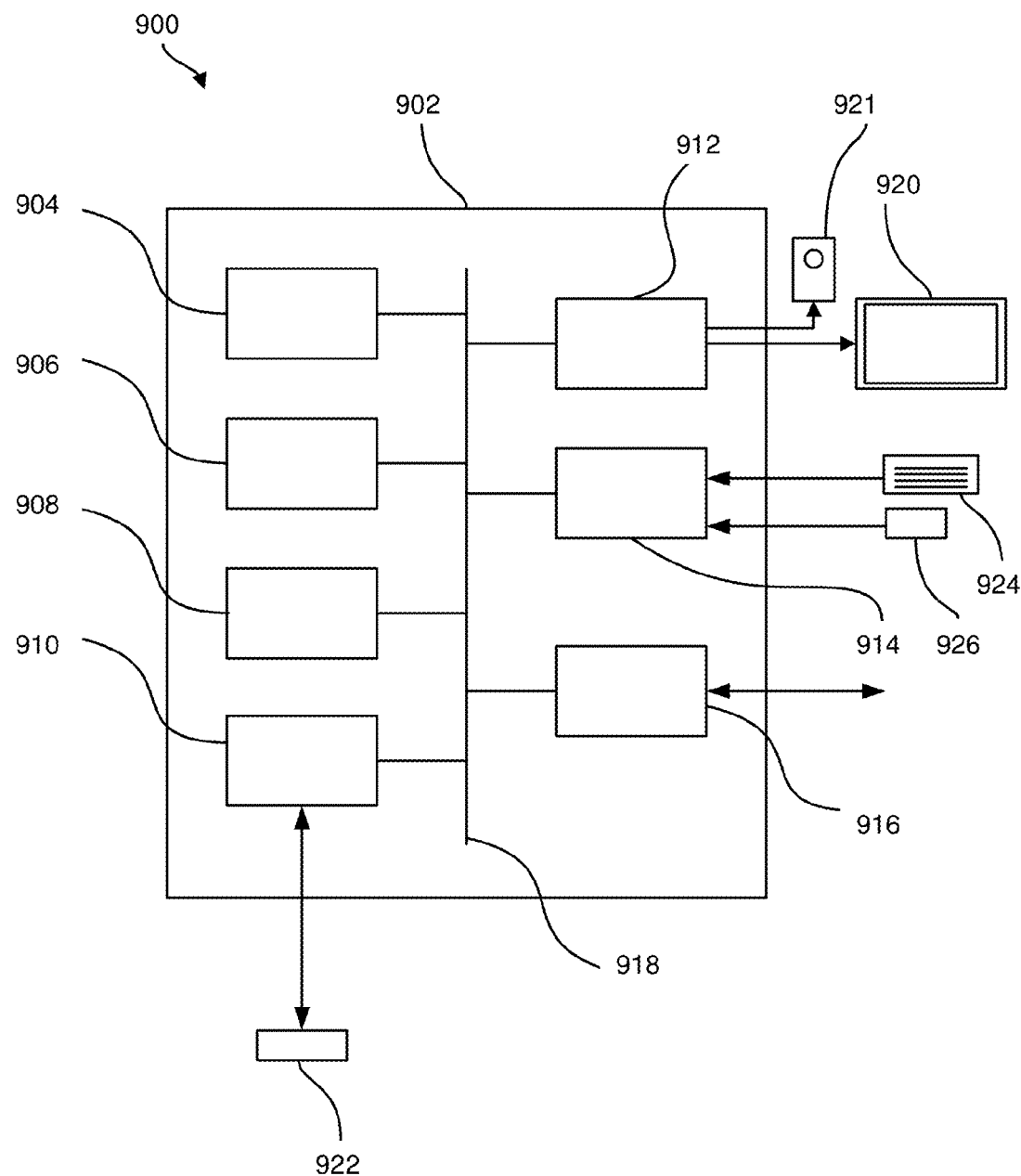
FIG. 9 is an example of a computing device suitable for implementing embodiments of the invention.

Optionally the Eye Pattern representation and/or any of the generated representations can be displayed to a user on a display such as user output interface 912 in FIG. 9.

In an alternative embodiment, the comparison criterion may be whether or not the sample voltage is greater than or equal to the particular threshold value, or the comparison criterion may be whether or not the sample voltage is less than or equal to the particular threshold value, or the comparison criterion may be whether or not the sample voltage is less than the particular threshold value. If a criteria comprising a "less than" test is used then a corresponding change of the sense of the correction is also used.

In another alternative embodiment, the reference threshold value is approximately equal to a midpoint of a sampling range available for sampling the input signal.

Optionally, the correction applied to the second indication uses a power-law function. Optionally, the correct applied to the second indication is calculated as a logarithm of 0.5 divided by a logarithm of the first indication, each logarithm being to the same base, which can be any base.

The method may be carried out on a device comprising one or more computer systems 900. FIG. 9 schematically illustrates an example of such a computer system 900. The computer system 900 comprises a computer 902. The computer 902 comprises: a computer-readable storage medium 904, a memory 906, a processor 908, a storage medium interface 910, a user output interface 912, a user input interface 914 and a network interface 916, which are all linked together over one or more communication buses 918. The computer system 900 may also comprise one or more additional interfaces (not shown) such as one or more inputs for receiving input signals, the inputs feeding one or more digital circuits and/or one or more analogue to digital converters and/or one or more comparator circuits.

The storage medium 904 may be any form of non-volatile data storage device such as one or more of a hard disk drive, a magnetic disc, an optical disc, a ROM, etc. The storage medium 904 may store an operating system for the processor 908 to execute in order for the computer 902 to function. The storage medium 904 may also store one or more computer programs (or software or instructions or code) that form part of an embodiment of the invention.

The memory 906 may be any random access memory (storage unit or volatile storage medium) suitable for storing data and/or computer programs (or software or instructions or code).

The processor 908 may be any data processing unit suitable for executing one or more computer programs (such as those stored on the storage medium 904 and/or in the memory 906), some of which may be computer programs according to embodiments of the invention or computer programs that, when executed by the processor 908, cause the processor 908 to carry out a method according to an embodiment of the invention and configure the system 900 to be a system according to an embodiment of the invention. The processor 908 may comprise a single data processing unit or multiple data processing units operating in parallel or in cooperation with each other. The processor 908, in carrying out data processing operations for embodiments of the invention, may store data to and/or read data from the storage medium 904 and/or the memory 906.

The storage medium interface 910 may be any unit for providing an interface to a data storage device 922 external to, or removable from, the computer 902. The data storage device 922 may be, for example, one or more of an optical disc, a magnetic disc, a solid-state-storage device, etc. The storage medium interface 910 may therefore read data from, or write data to, the data storage device 922 in accordance with one or more commands that it receives from the processor 908.

The user input interface 914 is arranged to receive input from a user, or operator, of the system 900. The user may provide this input via one or more input devices of the system 900, such as a mouse (or other pointing device) 926 and/or a keyboard 924, that are connected to, or in communication with, the user input interface 914. However, it will be appreciated that the user may provide input to the computer 902 via one or more additional or alternative input devices (such as a touch screen). The computer 902 may store the input received from the input devices via the user input interface 914 in the memory 906 for the processor 908 to subsequently access and process, or may pass it straight to the processor 908, so that the processor 908 can respond to the user input accordingly.

The user output interface 912 is arranged to provide a graphical/visual and/or audio output to a user, or operator, of the system 900. As such, the processor 908 may be arranged to instruct the user output interface 912 to form an image/video signal representing a desired graphical output, and to provide this signal to a monitor (or screen or display unit) 920 of the system 900 that is connected to the user output interface 912. Additionally or alternatively, the processor 908 may be arranged to instruct the user output interface 912 to form an audio signal representing a desired audio output, and to provide this signal to one or more speakers 921 of the system 900 that is connected to the user output interface 912.

Finally, the network interface 916 provides functionality for the computer 902 to download data from and/or upload data to one or more data communication networks.

It will be appreciated that the architecture of the computer system 900 illustrated in FIG. 9 and described above is merely exemplary and that other computer systems 900 with different architectures (for example with fewer components than shown in FIG. 9 or with additional and/or alternative components than shown in FIG. 9) may be used in embodiments of the invention.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements. It should be noted that in some embodiments, the separation of functionality and processing between the described elements is purely conceptual and is presented herein merely for ease of explanation.

It will be appreciated that the above-mentioned functionality may be implemented as one or more corresponding modules, e.g. as hardware modules and/or software modules. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may together be implemented by a single module.

It will be appreciated that the methods described have been shown as individual steps carried out in a specific order. However, the skilled person will appreciate that these steps may be combined or carried out in a different order whilst still achieving the desired result.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program," as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disk (such as a hard drive or a floppy disk), an optical disk (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

What is claimed is:

1. A method of generating a representation of an electrical signal, the method comprising:
   for each predetermined threshold value of a plurality of predetermined threshold values:
     determining, for a respective first plurality of samples of the signal, a first indication of a number of said first plurality of samples having a predetermined property that meets a comparison criterion with respect to a reference threshold value;
     determining, for a respective second plurality of samples of the signal, a second indication of a number of said second plurality of samples having said predetermined property that meets the comparison criterion with respect to said predetermined threshold value, wherein the respective second plurality of samples correspond in time to the respective first plurality of samples; and
     correcting the second indication using the first indication to thereby derive a respective corrected indication of a number of said second plurality of samples having said predetermined property that meets said comparison criterion with respect to said predetermined threshold value; and
   generating the representation of the signal using the respective corrected indications,
   wherein the reference threshold value is approximately equal to either a mean amplitude for the signal or a midpoint of a sampling range available for sampling the signal.

2. The method of claim 1, wherein the signal is a serial digital bit stream signal having a bit period.

3. The method of claim 2, wherein each sample of the respective first plurality of samples relates to the same bit period as a corresponding sample of the respective second plurality of samples.

4. The method of claim 2, wherein each sample of the respective first plurality of samples is sampled at a time offset that is substantially at a midpoint of a bit period.

5. The method of claim 4, wherein the time offset and/or bit period is derived using a clock recovery technique.

6. The method of claim 2, further comprising differentiating the respective corrected indications against the respective predetermined threshold values, thereby deriving a series of intensity values which constitute the representation of the signal, wherein the representation of the signal is thereby a vertical slice through an Eye Pattern representation of the signal.

7. The method of claim 6, wherein the method is repeated for a plurality of time delays with respect to a bit period, wherein each of the second plurality of samples is sampled at a time offset within the bit period which is determined according to the respective time delay, and wherein each of the first plurality of samples is sampled at a reference time offset within the bit period that is substantially constant for each respective time delay, and wherein the respective representations of the signal for each of the plurality of time delays are combined side by side so as to generate an Eye Pattern representation of the signal.

8. The method of claim 7, wherein the reference time offset is substantially at the midpoint of the bit period.

9. The method of claim 1, wherein the predetermined property of a sample is based on one or more of a voltage for said sample and a current for said sample.

10. The method of claim 1, wherein said comparison criterion with respect to a particular threshold value is selected from the group of comparison criteria comprising:
a comparison criterion which is deemed to be met when said predetermined property of a sample is greater than or equal to said particular threshold value;
a comparison criterion which is deemed to be met when said predetermined property of a sample is greater than said particular threshold value;
a comparison criterion which is deemed to be met when said predetermined property of a sample is less than or equal to said particular threshold value; and
a comparison criterion which is deemed to be met when said predetermined property of a sample is less than said particular threshold value.

11. The method of claim 1, wherein the correction applied to the second indication is based on the difference between the first indication and a value corresponding to 50% of a total number of said respective first plurality of samples.

12. The method of claim 1, wherein the correction applied to the second indication uses a power-law function.

13. The method of claim 1, wherein the correction applied to the second indication is calculated as a logarithm of 0.5 divided by a logarithm, to the same base, of the first indication.

14. A system comprising at least one processor arranged to:
for each predetermined threshold value of a plurality of predetermined threshold values:
determine, for a respective first plurality of samples of a signal, a first indication of a number of said first plurality of samples having a predetermined property that meets a comparison criterion with respect to a reference threshold value;
determine, for a respective second plurality of samples of the signal, a second indication of a number of said second plurality of samples having said predetermined property that meets the comparison criterion with respect to said predetermined threshold value, wherein the respective second plurality of samples correspond in time to the respective first plurality of samples; and
correct the second indication using the first indication to thereby derive a respective corrected indication of a number of said second plurality of samples having said predetermined property that meets said comparison criterion with respect to said predetermined threshold value; and
generate the representation of the signal using the respective corrected indications,
wherein the reference threshold value is approximately equal to either a mean amplitude for the signal or a midpoint of a sampling range available for sampling the signal.

15. A non-transitory computer-readable medium storing instructions which when executed by one or more processors cause the one or more processors to:
for each predetermined threshold value of a plurality of predetermined threshold values:
determine, for a respective first plurality of samples of a signal, a first indication of a number of said first plurality of samples having a predetermined property that meets a comparison criterion with respect to a reference threshold value;
determine, for a respective second plurality of samples of the signal, a second indication of a number of said second plurality of samples having said predetermined property that meets the comparison criterion with respect to said predetermined threshold value, wherein the respective second plurality of samples correspond in time to the respective first plurality of samples; and
correct the second indication using the first indication to thereby derive a respective corrected indication of a number of said second plurality of samples having said predetermined property that meets said comparison criterion with respect to said predetermined threshold value; and
generate the representation of the signal using the respective corrected indications,
wherein the reference threshold value is approximately equal to either a mean amplitude for the signal or a midpoint of a sampling range available for sampling the signal.

16. A system for generating Eye Patterns, wherein the system comprises:
a sampler system that, for each of a plurality of offset sampling positions spanning at least part of a range of voltages comprised in a serial data bit stream signal and spanning at least part of a bit period of the signal, substantially simultaneously measures a proportion of samples of the signal which meet or exceed the voltage of the respective offset sampling position and measures a proportion of the samples which meet or exceed a voltage of a reference sampling position which is substantially in the centre of the bit period; and
a correction module that uses the respective proportion measured at the reference sampling position to correct the respective proportion measured at each offset sampling position, which respective corrected proportion is then combined with similarly corrected proportions for others of the plurality of offset sampling positions to derive an Eye Pattern representation of the signal,
wherein the voltage of the reference sampling position is approximately equal to either a mean amplitude for the signal or a midpoint of a sampling range available for sampling the signal.

* * * * *